US008179877B2

(12) United States Patent
Pani et al.

(10) Patent No.: US 8,179,877 B2
(45) Date of Patent: May 15, 2012

(54) METHOD AND APPARATUS FOR CREATING AN ENHANCED MEDIUM ACCESS CONTROL PACKET DATA UNIT FOR ENHANCED TRANSPORT FORMAT COMBINATION SELECTION IN WIRELESS COMMUNICATIONS

(75) Inventors: Diana Pani, Montreal (CA); Paul Marinier, Brossard (CA); Stephen E. Terry, Northport, NY (US); Christopher R. Cave, Verdun (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 662 days.

(21) Appl. No.: 12/239,097

(22) Filed: Sep. 26, 2008

(65) Prior Publication Data

US 2009/0086709 A1   Apr. 2, 2009

Related U.S. Application Data

(60) Provisional application No. 60/976,319, filed on Sep. 28, 2007, provisional application No. 60/975,955, filed on Sep. 28, 2007.

(51) Int. Cl.
*H04J 3/24* (2006.01)
(52) U.S. Cl. ............ 370/349; 370/470; 370/474
(58) Field of Classification Search ............ 370/328, 370/329, 338, 341, 349, 389–394, 470–477
See application file for complete search history.

(56) References Cited

U.S. PATENT DOCUMENTS

| | | | |
|---|---|---|---|
| 6,904,016 B2 | 6/2005 | Kuo et al. | |
| 7,206,295 B2 | 4/2007 | Seguin | |
| 7,593,694 B2 | 9/2009 | Michel et al. | |
| 7,729,719 B2 | 6/2010 | Bergstrom et al. | |
| 2002/0021714 A1 | 2/2002 | Seguin | |
| 2006/0176806 A1 | 8/2006 | Yoshihara et al. | |

(Continued)

FOREIGN PATENT DOCUMENTS

EP    0 991 208    5/2000

(Continued)

OTHER PUBLICATIONS

Ericsson et al., "New Work Item Proposal: Improved L2 for Uplink", 3GPP TSG-RAN Meeting #37, RP-070717, (Riga, Latvia, Sep. 11-14, 2007).

(Continued)

*Primary Examiner* — Ricky Ngo
*Assistant Examiner* — Kan Yuen
(74) *Attorney, Agent, or Firm* — Condo Roccia LLP

(57) ABSTRACT

Efficient enhanced transport format combination (E-TFC) selection methods and apparatus support flexible radio link control (RLC) packet data unit (PDU) size and medium access control (MAC) layer segmentation. Methods for filling an enhanced medium access control (MAC-e) packet data unit (PDU) with data from logical channels as part of E-TFC selection are provided. In one embodiment, the E-TFC selection algorithm employs a single request from the MAC layer to the RLC layer to request the number of bits it is allowed to send for a logical channel to create enhanced MAC-e PDUs. In another embodiment, the MAC entity performs multiple requests to the RLC entity. In another embodiment, the MAC entity makes a single request to the RLC entity to create one or more enhanced MAC-e PDUs of a set size. A technique is also provided for maintaining a guaranteed bit rate (GBR) for non-scheduled data flows with variable-length headers.

36 Claims, 7 Drawing Sheets

U.S. PATENT DOCUMENTS

| | | | |
|---|---|---|---|
| 2006/0268938 | A1 | 11/2006 | Terry |
| 2007/0060139 | A1 | 3/2007 | Kim et al. |
| 2007/0073895 | A1 | 3/2007 | Sebire et al. |
| 2007/0230384 | A1 | 10/2007 | Yi et al. |
| 2007/0263568 | A1* | 11/2007 | Kim et al. ............... 370/331 |
| 2008/0080381 | A1 | 4/2008 | Maheshwari et al. |
| 2008/0298332 | A1 | 12/2008 | Erami |
| 2009/0036061 | A1 | 2/2009 | Chun et al. |
| 2009/0097444 | A1 | 4/2009 | Lohr et al. |

FOREIGN PATENT DOCUMENTS

| | | |
|---|---|---|
| EP | 1158715 A1 | 11/2001 |
| EP | 1 487 161 | 12/2004 |
| EP | 1 720 322 | 11/2006 |
| EP | 1 764 980 | 3/2007 |
| WO | 00/21253 | 4/2000 |
| WO | 2007/091965 | 8/2007 |

OTHER PUBLICATIONS

Ericsson, "RLC PDU Size Adaption", 3GPP TSG-RAN2 Meeting #62, R2-082815, (Kansas City, USA, May 5-9, 2008).

Ericsson, "Support for Flexible RLC PDU Sizes in UL", 3GPP TSG-RAN WG #59-bis, R2-074033, (Shanghai, China, Oct. 8-12, 2007).

Third Generation Partnership Project, "Technical Specification Group Radio Access Network; HSPA Evolution (FDD); (Release 7)", 3GPP TR 25.999 V2.1.0, (May 2007).

Third Generation Partnership Project, "Technical Specification Group Radio Access Network; HSPA Evolution (FDD); (Release 7)", 3GPP TR 25.999 V2.2.0, (Sep. 2007).

Third Generation Partnership Project, "Technical Specification Group Radio Access Network; HSPA Evolution (FDD); (Release 7)", 3GPP TR 25.999 V2.3.0, (Sep. 2007).

Third Generation Partnership Project, "Technical Specification Group Radio Access Network; HSPA Evolution (FDD); (Release 7)", 3GPP TR 25.999 V2.4.0, (Sep. 2007).

Third Generation Partnership Project, "Technical Specification Group Radio Access Network; High Speed Packet Access (HSPA) Evolution Frequency; Division Duplex (FDD) (Release 7)", 3GPP TR 25.999 V7.1.0, (Mar. 2008).

Third Generation Partnership Project, "Technical Specification Group Radio Access Network; Medium Access Control (MAC) Protocol Specification (Release 7)", 3GPP TS 25.321 V7.5.0, (Jun. 2007).

Third Generation Partnership Project, "Technical Specification Group Radio Access Network; Medium Access Control (MAC) Protocol Specification (Release 7)", 3GPP TS 25.321 V7.10.0, (Sep. 2008).

Third Generation Partnership Project, "Technical Specification Group Radio Access Network; Medium Access Control (MAC) Protocol Specification (Release 8)", 3GPP TS 25.321 V8.3.0, (Sep. 2008).

Third Generation Partnership Project, "Technical Specification Group Radio Access Network; MAC Protocol Specification (Release 5)," 3GPP TS 25.321 v5.13.0 (Mar. 2007).

Third Generation Partnership Project, "Technical Specification Group Radio Access Network; MAC Protocol Specification (Release 5)," 3GPP TS 25.321 v5.14.0 (Sep. 2008).

Third Generation Partnership Project, "Technical Specification Group Radio Access Network; MAC Protocol Specification (Release 6)," 3GPP TS 25.321 v6.13.0 (Jun. 2007).

Third Generation Partnership Project, "Technical Specification Group Radio Access Network; MAC Protocol Specification (Release 6)," 3GPP TS 25.321 v6.16.0 (Sep. 2008).

Third Generation Partnership Project, "Technical Specification Group Radio Access Network; Radio Resource Control (RRC); Protocol Specification (Release 4)," 3GPP TS 25.331 V4.19.0 (Jun. 2008).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 5)," 3GPP TS 25.331 V5.22.1 (Aug. 2008).

Third Generation Partnership Project, "Technical Specification Group Radio Access Network; Radio Resource Control (RRC); Protocol Specification (Release 5)," 3GPP TS 25.331 V5.19.0 (Dec. 2006).

Third Generation Partnership Project, "Technical Specification Group Radio Access Network; Radio Resource Control (RRC); Protocol Specification (Release 6)," 3GPP TS 25.331 V6.14.0 (Jun. 2007).

Third Generation Partnership Project, "Technical Specification Group Radio Access Network; Radio Resource Control (RRC); Protocol Specification (Release 6)," 3GPP TS 25.331 V6.19.0 (Sep. 2008).

Third Generation Partnership Project, "Technical Specification Group Radio Access Network; Radio Resource Control (RRC); Protocol Specification (Release 7)," 3GPP TS 25.331 V7.5.0 (Jun. 2007).

Third Generation Partnership Project, "Technical Specification Group Radio Access Network; Radio Resource Control (RRC); Protocol Specification (Release 7)," 3GPP TS 25.331 V7.10.0 (Jun. 2007).

Third Generation Partnership Project, "Technical Specification Group Radio Access Network; Radio Resource Control (RRC); Protocol Specification (Release 8)," 3GPP TS 25.331 V8.4.0 (Sep. 2008).

Third Generation Partnership Project, "Technical Specification Group Radio Access Network; RLC protocol specification (Release 6)," 3GPP TS 25.322 V6.10.0 (Jun. 2007).

Third Generation Partnership Project, "Technical Specification Group Radio Access Network; RLC protocol specification (Release 6)," 3GPP TS 25.322 V6.12.0 (Jun. 2008).

3rd Generation Partnership Project (3GPP), TS 25.322 V8.2.0, "3rd Generation Partnership Project; Technical Specification Group Radio Access Network; Radio Link Control (RLC) Protocol Specification (Release 8)", May 2008, 89 pages.

Vacirca et al., "On the Effects of ARQ Mechanisms on TCP Performance in Wireless Environments", GLOBECOM 2003, IEEE, Dec. 1-5, 2003, 1-5.

Kaist, "EE520 Telecommunication Network", Communication Networks Research Lab., 2000, 1-107.

* cited by examiner

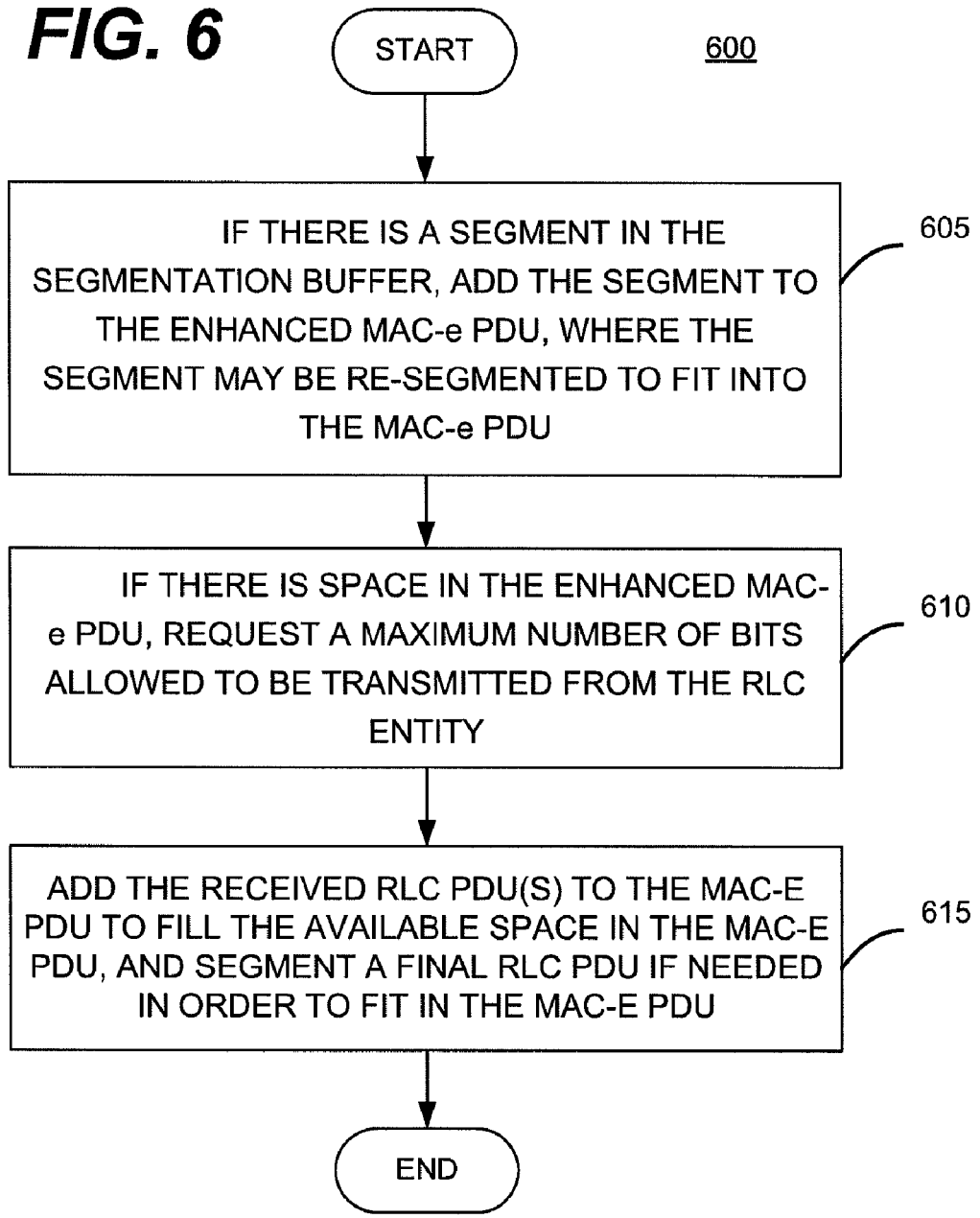

METHOD AND APPARATUS FOR CREATING AN ENHANCED MEDIUM ACCESS CONTROL PACKET DATA UNIT FOR ENHANCED TRANSPORT FORMAT COMBINATION SELECTION IN WIRELESS COMMUNICATIONS

CROSS REFERENCE TO RELATED APPLICATION(S)

This application claims the benefit of U.S. Provisional Application No. 60/976,319, filed Sep. 28, 2007, and U.S. Provisional Application No. 60/975,955 filed on Sep. 28, 2007 which are incorporated by reference as if fully set forth.

FIELD OF INVENTION

This application is related to wireless communications.

BACKGROUND

Wireless communication systems following Universal Mobile Telecommunications Systems (UMTS) technology, were developed as part of Third Generation (3G) Radio Systems, and is maintained by the Third Generation Partnership Project (3GPP). A typical UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit/receive units (WTRUs), referred to as user equipments (UEs) in the 3GPP standard, via a Uu radio interface. A commonly employed air interface defined in the UMTS standard is wideband code division multiple access (W-CDMA). The UTRAN has one or more radio network controllers (RNCs) and base stations, referred to as Node Bs by 3GPP, which collectively provide for the geographic coverage for wireless communications with UEs. Uplink (UL) communications refer to transmissions from UE to Node B, and downlink (DL) communications refer to transmissions from Node B to UE. One or more Node Bs are connected to each RNC via an Iub interface; RNCs within a UTRAN communicate via an Iur interface.

According to 3GPP standard Release 6 for high speed uplink packet access (HSUPA), the MAC layer multiplexes higher layer data into MAC-e PDUs. In a transmission time interval (TTI), the MAC layer sends one MAC-e PDU to the PHY layer to be transmitted over the enhanced dedicated channel (E-DCH) dedicated physical data control channel (E-DPDCH). As part of link adaptation, the MAC layer performs enhanced transport format combination (E-TFC) selection based on radio link control (RLC) logical channel priority, RLC buffer occupancy, physical channel conditions, serving grants, non-serving grants, power limitations, hybrid automatic repeat request (HARQ) profile and logical channel multiplexing.

As part of the E-TFC selection function, the UE initially identifies the highest priority higher layer MAC-d flow that has data to be transmitted. The UE then identifies the MAC-d flow(s) which are allowed to be multiplexed with this MAC-d flow and whose grants allow them to transmit in the current TTI. Based on the HARQ profile of the selected MAC-d flow, the UE identifies the power offset to use for transmission. Based on this power offset and the E-TFC restriction procedure, the MAC determines the maximum supported MAC-e PDU size or E-TFC that can be sent by the UE, called the maximum supported payload, for the upcoming transmission, based only on available power, without taking into account available serving and/or non-serving grants. The E-TFC selection algorithm then determines the largest amount of data, called the scheduled payload, that can be transmitted based on the serving grant and the selected power offset. In the case of non-scheduled flows, the E-TFC selection algorithm takes into account the non-scheduled grant to determine a non scheduled payload. The total granted payload is equivalent to the determined scheduled and non-scheduled payload, and is defined as the amount of data that the UE is allowed to transmit based on serving and non-scheduled grants. However, due to the fact that the UE may have limited power, the available amount of data that the UE can transmit (available payload) is the equivalent of the minimum value between the maximum supported payload and the total granted payload.

Once the available payload is determined, the MAC layer requests data from the logical channels corresponding to the MAC-d flows that are allowed to be multiplexed in the current TTI in order of priority. When all the data to fill a MAC-e PDU according to the available payload is available, or when no more RLC data is available, the MAC-e PDU is sent to the physical layer to be transmitted over the E-DPDCH with the selected beta factor, which is a gain factor.

According to 3GPP standard Release 6, the radio link control (RLC) layer in acknowledged mode (AM) can only operate using fixed RLC protocol data unit (PDU) sizes. In addition, the high-speed medium access control (MAC-hs) entity in the Node B and the medium access control (MAC-e/es) entity in the UE do not support segmentation of the service data units (SDUs) from higher layers. These restrictions may result in performance limitations, especially as high speed packet access (HSPA) evolves towards higher data rates. In order to reach higher data rates and reduce protocol overhead and padding, a number of new features were introduced to the layer 2 (L2) protocol in 3GPP Release 7. In particular, flexible RLC PDU sizes and MAC segmentation in the downlink were introduced. However, corresponding L2 enhancements were not introduced for uplink operation in 3GPP Release 7.

More recently, a new 3GPP work item has been proposed for Improved L2 Uplink to introduce enhancements to L2 operation in the uplink. Some of the objectives of Improved L2 Uplink include: support for flexible RLC PDU sizes; support for MAC segmentation of higher layer PDUs including MAC-d and MAC-c PDUs; smooth transition between old and new protocol formats; and support for seamless state transitions between the CELL_DCH, CELL_FACH, CELL_PCH and URA_PCH states, dependent on potential enhancements to the CELL_FACH uplink transmission.

The current E-TFC selection algorithm is designed for current 3GPP standards releases, including Release 7 or earlier, and the current enhanced dedicated channel (E-DCH) functionalities, which require fixed RLC PDU sizes. It is recognized that current E-TFC selection algorithm for Release 7 or earlier will result in inefficient creation of MAC-e/es PDUs under the proposed Improved Layer 2 Uplink because the current E-TFC selection algorithm is not designed to take into account flexible RLC PDU sizes for every logical channel, segmentation of RLC PDUs, and flexible header format size based on the amount of RLC PDUs in a enhanced MAC-es PDU.

Therefore, a new E-TFC selection function that takes into consideration the additional functionalities including flexible RLC PDU size, segmentation of RLC PDUs and flexible header format size when creating a MAC-e PDU with optimal RLC PDU sizes is desired.

SUMMARY

Methods and apparatus for enhanced transport format combination (E-TFC) for uplink wireless communications are disclosed. The proposed techniques for E-TFC selection support flexible radio link control (RLC) packet data unit (PDU) size as well as medium access control (MAC) layer segmentation of MAC-d PDUs. Accordingly, RLC PDUs are created to properly fit into selected E-TFC transport block sizes. Based on the selected E-TFC, the MAC entity and RLC entity work together to create RLC PDU sizes on a transmission time interval (TTI) basis to maximize the amount of data to be transmitted and reduce the amount of overhead between the RLC and MAC protocols.

Methods for filling an enhanced MAC-e packet data unit (PDU) with data from logical channels as part of E-TFC selection are provided. In one embodiment, the E-TFC selection algorithm uses a single request from the MAC layer to the RLC layer to request the number of bits it is allowed to send for a logical channel to create one or more PDUs of possibly different sizes. In another embodiment, the MAC entity performs multiple requests to the RLC entity. In another embodiment, the MAC entity makes a single request to the RLC entity to create one or more PDUs of a set size. A technique is also provided for maintaining a guaranteed bit rate (GBR) for non-scheduled data flows with variable-length headers.

BRIEF DESCRIPTION OF THE DRAWINGS

A more detailed understanding may be had from the following description, given by way of example in conjunction with the accompanying drawings wherein:

FIG. 6 shows a flow diagram of a simplified procedure for filling an enhanced MAC-e PDU with data from logical channels as part of E-TFC selection in accordance with another embodiment.

DETAILED DESCRIPTION

Figure 1:
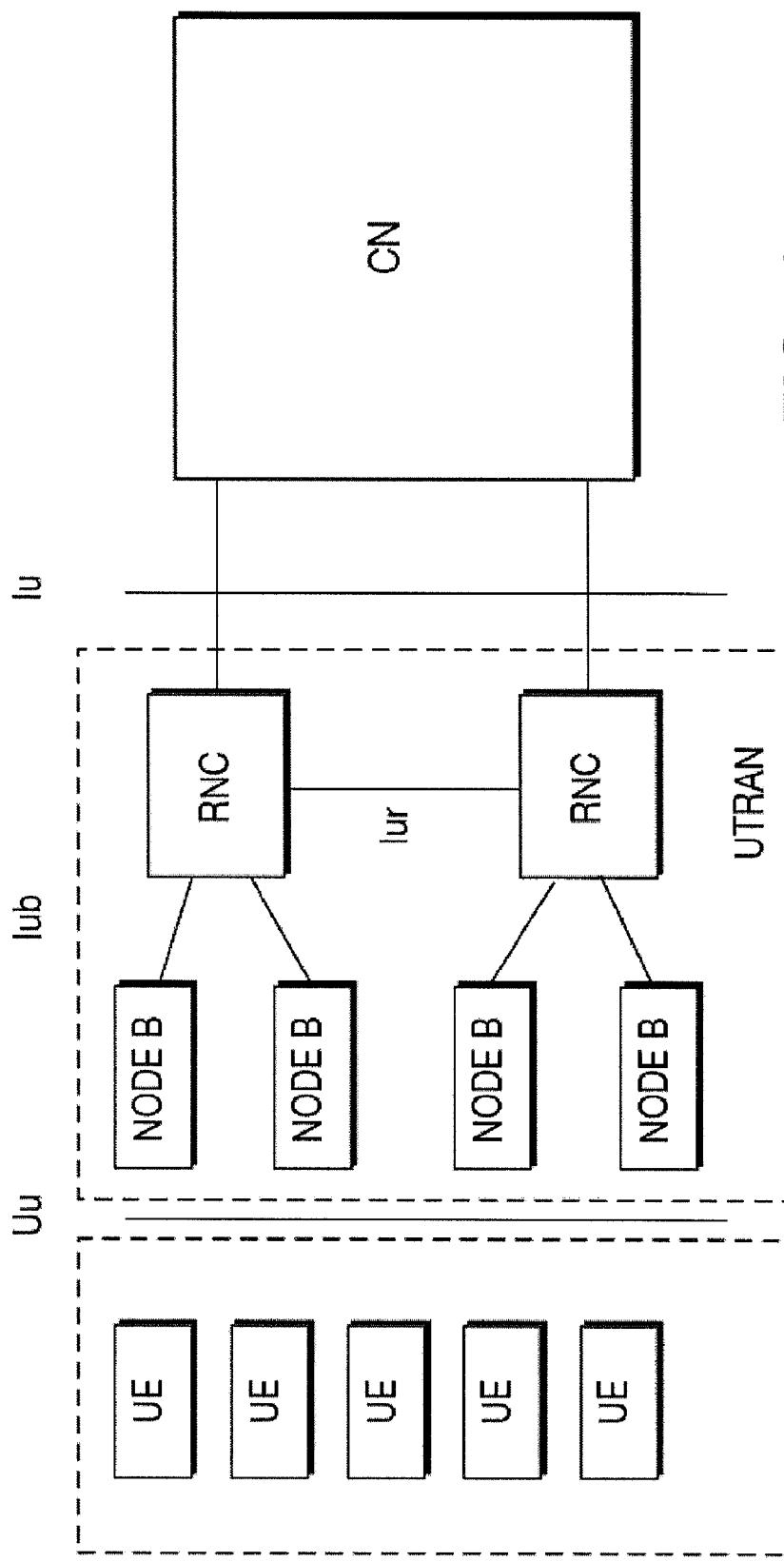
FIG. 1 shows an overview of the system architecture of a conventional Universal Mobile Telecommunications Systems (UMTS) network.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Efficient enhanced transport format combination (E-TFC) selection algorithms are provided that take into account the new functionalities added to the Layer 2 protocol as part of the proposed 3GPP Improved Layer 2 (L2) Uplink work item. The proposed embodiments for E-TFC selection describe the sequence of events a WTRU may follow when it has to fill an enhanced MAC-e packet data unit (PDU) with data from one or more radio link control (RLC) logical channels or MAC-d and MAC-c data flows. The proposed embodiments for E-TFC selection may be used individually or in any combination. While E-TFC selection is described as being performed by a WTRU or UE for uplink communications, the teachings herein may be applied to both downlink and uplink communications and may be performed by a base station, Node B, or Node B in combination with a radio network controller (RNC).

Herein, enhanced MAC-e, enhanced MAC-es, and enhanced MAC-e/es are used to represent enhanced versions of existing medium access control (MAC) protocols in high speed packet access (HSPA), including, but not limited to, MAC-e, MAC-es and MAC-e/es. The Remaining Available Payload refers to the maximum amount of data that can be transmitted due to the available grant, including serving and non-serving grant, the available power, the selected power offset and scheduling information. The Remaining Granted Payload refers to the Remaining Non-Scheduled Payload when a non-scheduled MAC-d flow is being processed and to the Remaining Scheduled Payload for scheduled MAC-d flows. Herein, the function MIN(A, B) returns the minimum value from among the parameters A and B in terms of number of bits.

A higher layer PDU refers to a MAC-d PDU, a MAC-c PDU, or an RLC PDU. MAC-d, MAC-c and RLC PDUs may be treated equivalently in the proposed embodiments herein. An RLC PDU belongs to a dedicated logical channel and is forwarded to the MAC-d entity. The MAC-d entity then forwards the data to the enhanced MAC-es entity. The output of the MAC-d is called a MAC-d PDU. A MAC-d PDU includes data received from the dedicated control channel (DCCH) or the dedicated traffic channel (DTCH) logical channels, while a MAC-c PDU includes data received from common channels such as the common control channel (CCCH). For convenience, some of the embodiments herein may be described with reference to RLC PDUs, however, the embodiments are equally applicable to MAC-d or MAC-c PDUs and have the same functionality for RLC, MAC-d and MAC-c PDUs.

Figure 2:
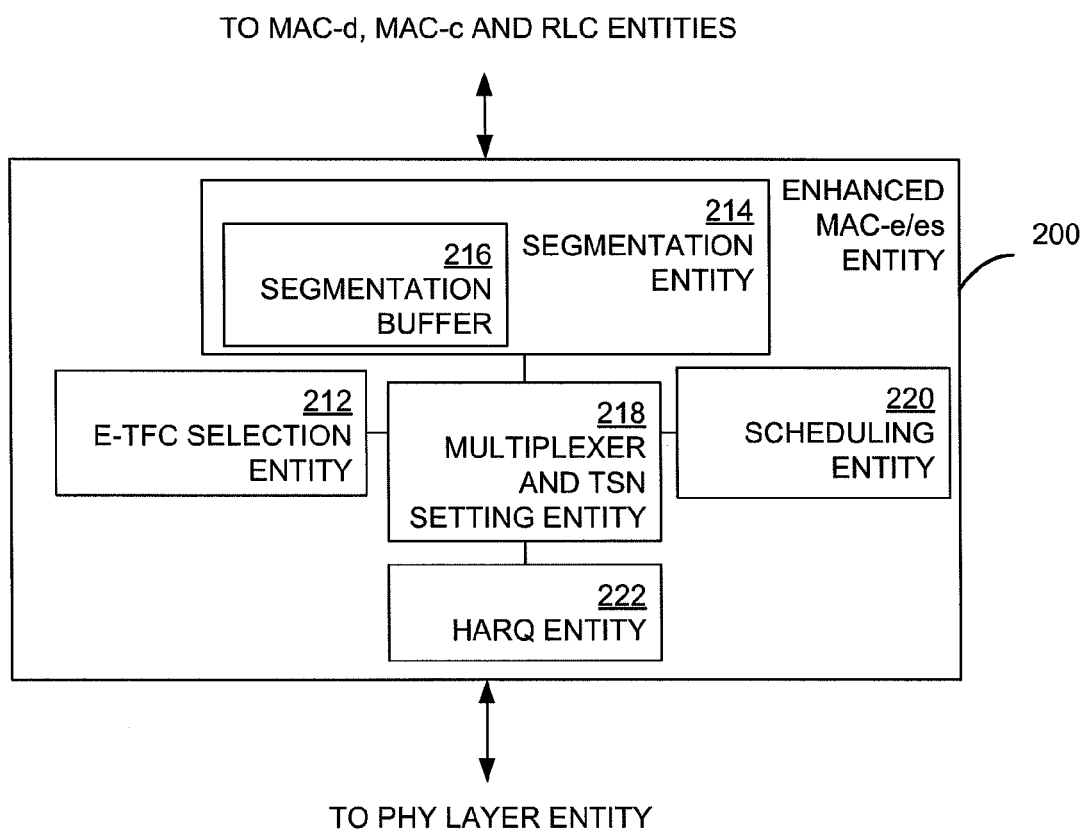
FIG. 2 shows a block diagram of an enhanced MAC-e/es entity in accordance with the teaching herein.

FIG. 2 shows a block diagram of an enhanced MAC-e/es entity 200 in accordance with the teaching herein. The enhanced MAC-e/es entity 200 multiplexes logical channel data from higher layers entities, including the MAC-d, MAC-c, and radio link control (RLC) entities, into enhanced MAC-e PDUs and provides them in the form of transport blocks (TBs) to the physical (PHY) layer entity. The enhanced MAC-e/es entity 210 may include the following entities: a hybrid automatic repeat request (HARQ) entity 222, a segmentation entity 214, which may contain a segmentation buffer 216, a multiplexer and TSN setting entity 218, a scheduling entity 220, and an enhanced transport format combination (E-TFC) selection entity 212.

The HARQ entity 222 is responsible for handling MAC layer functions relating to the HARQ protocol for error correction, including storing and retransmitting enhanced MAC-e payloads. The segmentation entity 214 segments higher layer PDUs when they are too large to fit into the enhanced MAC-e PDU and sends the segment to multiplexer 218. The remaining segment is stored in the segmentation buffer 216. The multiplexer and TSN setting entity 218 is responsible for concatenating multiple enhanced MAC-es SDUs, which include segmented or complete higher layer PDUs, into enhanced MAC-es PDUs. The multiplexer and TSN setting entity 218 also multiplexes multiple enhanced MAC-es PDUs from the multiplexed logical channels into enhanced MAC-e PDUs to be provided to the PHY layer for transmission in the next transmission time interval (TTI) as instructed by the E-TFC selection entity 212. The scheduling entity 220 is responsible for routing associated uplink signaling. The E-TFC selection entity 212 determines how much data can be sent in a TTI based on scheduling information, Relative Grants (RGs), Absolute Grants (AGs), and Serving Grants (SGs) and available power resources and determines E-TFC restriction, which is used to determine the maximum available data the UE can transmit based on available power. E-TFC selection entity 212 also controls multiplexer 218.

In one embodiment, the E-TFC selection algorithm employs a single request from the MAC layer to the RLC layer. The enhanced MAC entity requests from the logical channel the number of bits it is allowed to send for that logical channel in a single request. Based on the indicated number of bits, the number of available data bits, and the number of new and retransmitted data bits, the RLC entity creates or delivers RLC PDUs to fit into an enhanced MAC-e PDU. Based on the E-TFC restriction, scheduled grant, non-scheduled grant for all MAC-d flows, and scheduling information, the WTRU determines the maximum amount of data that can be transmitted, referred to as the Remaining Available Payload. The Remaining Available Payload may account for the quantization loss for scheduled transmission when filling up the enhanced MAC-e PDU with logical channel bits. Once the Remaining Available Payload is calculated, if a Scheduling Information needs to be transmitted, it is subtracted from the Remaining Available Payload.

The E-TFC selection algorithm creates an enhanced MAC-e PDU according to one or more of the following rules, which may be used alone or in combination, for each logical channel. According to one rule, the bits in the segmentation buffer have transmission priority over other RLC PDUs of the logical channel being processed. According to another rule, if a segment in the segmentation entity is larger than the maximum amount of data to be transmitted for that logical channel, the WTRU may re-segment the MAC segment and send the maximum amount of data it can in the enhanced MAC-e PDU, taking into consideration the enhanced MAC-e/es header.

According to another rule, any remaining segment is stored in the segmentation buffer. According to another rule, if there is no segment in the segmentation buffer, or if there is still available space in the enhanced MAC-e PDU after a segment is added, the MAC entity can request from the logical channel the maximum number of bits it is allowed to transmit, as determined by the Remaining Available Payload and Remaining Granted Payload minus the size of any added segment including any MAC header bits required to transmit that segment if a segment was added. The RLC entity may then provide one or more new RLC PDUs of a optimally chosen size and/or one or more retransmitted RLC PDUs up to, or greater than, the requested number of bits.

According to another rule, a higher layer PDU, which may be an RLC MAC-d or MAC-c PDU, may be segmented by the segmentation entity when the last of the RLC PDU(s) provided would exceed the maximum allowed or available number of bits for that logical channel or MAC-d flow, while taking into account space required for MAC headers.

According to another rule, the amount of data to be transmitted and corresponding enhanced MAC-e/es headers may not exceed the maximum allowed number of bits, which is the Available Remaining Payload or the Available Granted Payload, for that logical channel, as indicated by the grant and/or the E-TFC restriction. Due to the fact that the enhanced MAC-e/es header is flexible and depends on the number of RLC PDUs in an enhanced MAC-e/es service data unit (SDU), the E-TFC selection entity must also take into consideration the additional header to be added with any additional enhanced MAC-es SDUs. This can be taken into account in the initial request to the RLC performed by the enhanced MAC-e/es entity. For example, the enhanced MAC-e/es may assume that K RLC PDUs will be received for the amount of remaining available bits. Accordingly, the enhanced MAC-e/es may calculate the number of bits to be requested according to the following calculation: Number of bits to be requested=(available bits that can be transmitted)−K×(additional number of header bits per RLC PDU)−(fixed number header bits for the logical channel). Alternatively, the RLC entity can take into consideration the number of additional header bits that would be required for each new RLC PDU created and the MAC just requests the available amount of bits from the logical channel. For example, after receiving the MAC request, for every new RLC PDU created or transmitted, the RLC entity may subtract the additional header bits from the total remaining bits it needs to forward to the enhanced MAC-e/es.

Figure 3A:
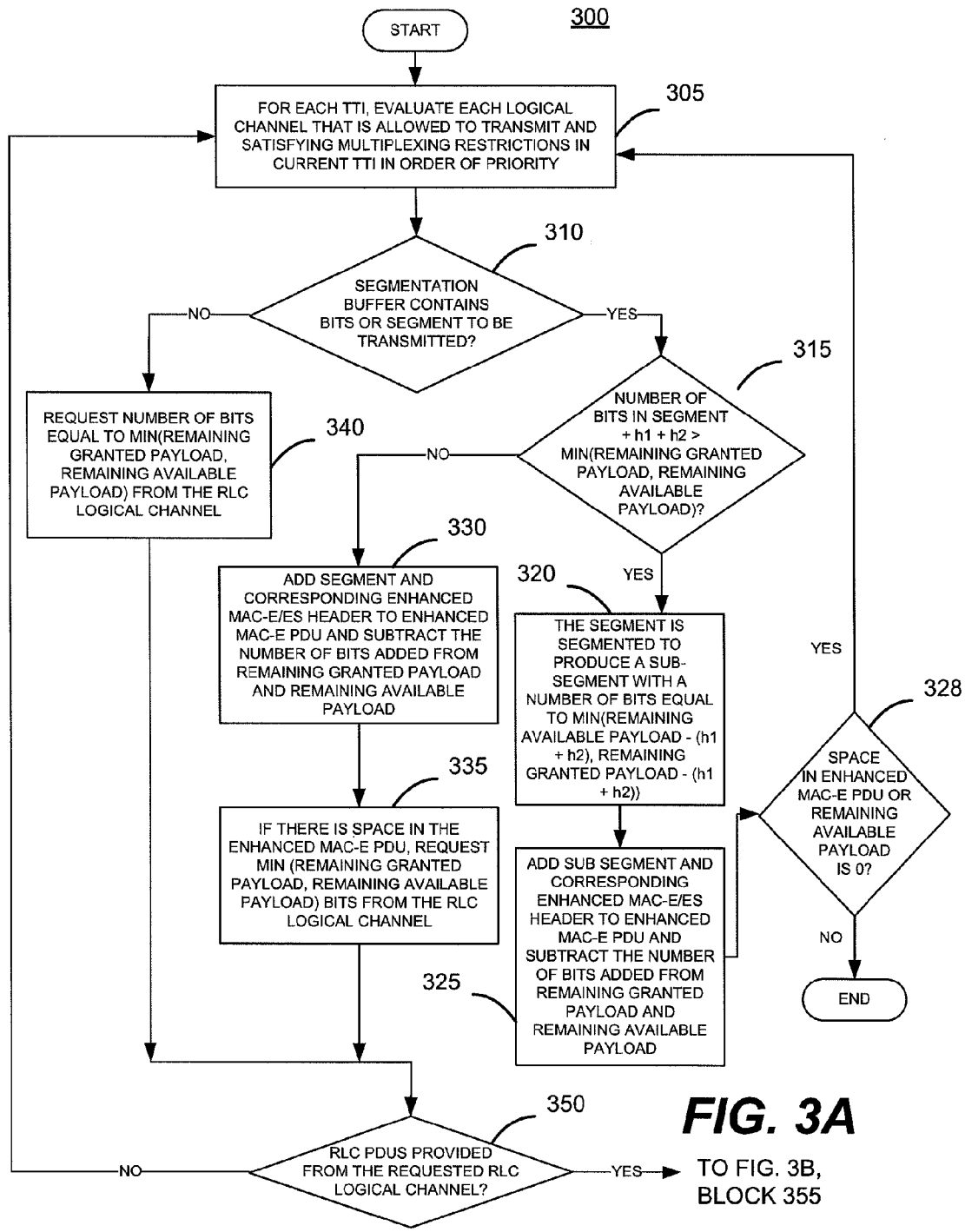
FIGS. 3A and 3B show a flow diagram of a procedure for filling an enhanced MAC-e packet data unit (PDU) with data from logical channels as part of E-TFC selection in accordance with one embodiment.
Figure 3B:
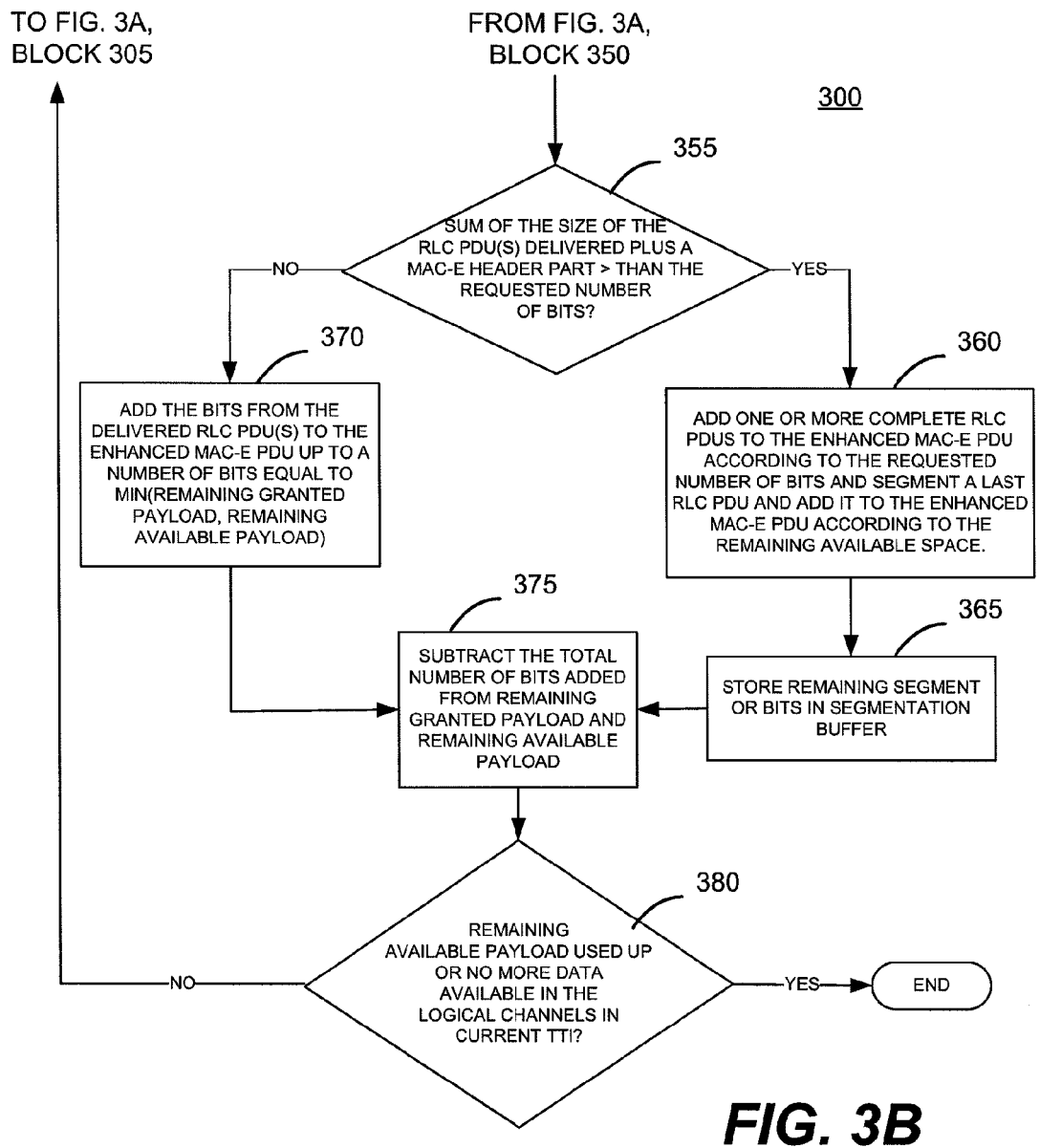

FIGS. 3A and 3B show a flow diagram of a procedure 300 for filling an enhanced MAC-e PDU with data from logical channels as part of E-TFC selection in accordance with the rules listed above according to one embodiment. In FIGS. 3A and 3B, h1 refers to the number of header bits needed per enhanced MAC-es PDU and h2 refers to the number of header bits needed for the enhanced MAC-e header per enhanced MAC-es SDU.

In step 305, in each TTI, each logical channel that is allowed to transmit and satisfying multiplexing restrictions in the current TTI is evaluated in order of priority. In step 310, it is determined if the segmentation buffer contains bits or a segment to be transmitted. If the segmentation buffer contains bits or a segment to be transmitted, then in step 315 it is determined if the number bits in the segment plus a corresponding enhanced MAC-e/es header of h1+h2 bits is greater than MIN(Remaining Available Payload, Remaining Granted Payload). If step 315 is true, then in step 320 the segment is further segmented to produce a sub-segment with a number of bits equal to MIN(Remaining Available Payload−(h1+h2), Remaining Granted Payload−(h1+h2)). In step 325, the sub-segment and corresponding enhanced MAC-e/es header are added to the enhanced MAC-e PDU and the number of bits added is subtracted from the Remaining Granted Payload and Remaining Available Payload. The number of bits added is equal to the number of bits in the sub-segment+h1+h2. If, in step 328, it is determined that there is no more space available in the enhanced MAC-e PDU or that the Remaining Available Payload is zero, then procedure 300 ends. Otherwise, procedure 300 returns to step 305 to repeat the procedure for the next logical channel.

If, as determined in step 315, the number bits in the segment+h1+h2 is less than MIN(Remaining Available Payload, Remaining Granted Payload), then in step 330 the segment and corresponding enhanced MAC-e/es header is added to the enhanced MAC-e PDU and the number of bits added is subtracted from the Remaining Granted Payload and Remaining Available Payload. The number of bits added is the number of bits in the segment+h1+h2. In step 335, if there is still space in the enhanced MAC-e PDU, then MIN(Remaining Available Payload, Remaining Granted Payload) bits are requested from the RLC logical channel. Additionally, bits may be requested from the RLC logical channel when the Remaining Granted Payload is greater than 0 and there is still space in the enhanced MAC-e PDU.

Optionally, the enhanced MAC-e/es header may be taken into account in the request to the RLC entity or by the RLC entity. More specifically, the RLC entity may take into account only the enhanced MAC-e header to be added per RLC PDU. When calculating the size of the RLC PDUs to be created, the UE subtracts the enhanced MAC-e header part, h2, for each RLC PDU it creates or retransmits from the available number of bits requested. Alternatively, the RLC entity may also take into account that one enhanced MAC-es header will be added for all RLC PDUs submitted to the enhanced MAC entity. Thus, initially, the RLC entity subtracts h1 from the requested number of bits, and then continues the creation of RLC PDUs, where it also takes into account N per RLC PDU created. However, since the RLC entity is not aware if the enhanced MAC entity had a segment to add from that logical channel and if the enhanced MAC-es header part for that logical channel has already been taken into account, it is preferable that the enhanced MAC entity takes into account the enhanced MAC-es header prior to requesting data from a logical channel.

If it was determined in step 310 that there are no bits to be transmitted in the segmentation buffer, then in step 340 a number of bits equal to MIN(Remaining Granted Payload, Remaining Available Payload) are requested from the RLC logical channel. Optionally, prior to requesting data from that logical channel, the enhanced MAC entity may subtract the enhanced MAC-es header from Remaining Granted Payload and Remaining Available Payload. With this option, the RLC entity only has to take into account the enhanced MAC-e header part for each RLC PDU it creates. If the enhanced MAC entity does not subtract the enhanced MAC-es header part, then the RLC may take this into account when generating RLC PDUs.

Following each of steps 335 and 340, it is determined in step 350 if RLC PDUs were provided from the requested RLC logical channel. If no RLC PDUs were provided from the requested logical channel, then procedure 300 returns to step 305 to be repeated for the next logical channel. If bits were provided from the RLC logical channel, then in step 355, it is determined if the sum of the size of the RLC PDU(s) delivered plus a MAC-e header part is greater than the requested number of bits. For example, if N RLC PDUs were delivered, where N is greater than or equal to 1, then the enhanced MAC-e header part to be added equals N times a number of bits h2, and the sum is compared to the requested number of bits which may be equal to MIN(Remaining Granted Payload, Remaining Available Payload). If the number of delivered bits from the RLC logical channel plus an enhanced MAC-e header part of N×h2 bits is less than the number of requested bits, then in step 370 the bits from the delivered RLC PDU(s) are added to the enhanced MAC-e PDU up to a number of bits equal to MIN(Remaining Granted Payload, Remaining Available Payload).

If the number of delivered bits from the RLC plus the enhanced MAC-e header part is greater than the number of requested bits, then in step 360, one or more complete RLC PDUs are added to the enhanced MAC-e PDU according to the requested number of bits and a last RLC PDU is then segmented and added to the enhanced MAC-e PDU according to the remaining available and granted space. More specifically, one or more complete RLC PDUs are added such that the sum of the RLC PDUs plus an enhanced MAC-e header part per RLC PDU is less than the number of requested bits. The remaining available space in terms of bits for the segmented last RLC PDU is determined according to the minimum of x1 and x2 where x1=Remaining Granted Payload−(size of RLC PDUs added to the enhanced MAC-e+h2 per RLC PDU added−h2 for the segment to be added) and x2=Remaining Available Payload−(size of RLC PDUs added to the enhanced MAC-e+h2 per RLC PDU added−h2 for the segment to be added). In step 365, the remaining segment or bits are stored in the segmentation buffer.

Following each of steps 365 and 370, the total number of bits added to the enhanced MAC-e PDU, which includes bits from associated headers, are subtracted from the Remaining Granted Payload and Remaining Available Payload in step 375. In step 380, the Remaining Available Payload is used up, or if no more data is available in the logical channels in the current TTI, then procedure 300 ends for that TTI. If the Remaining Available Payload is not all used up and if data is still available in the logical channels, then procedure 300 returns to step 305.

Figure 4:
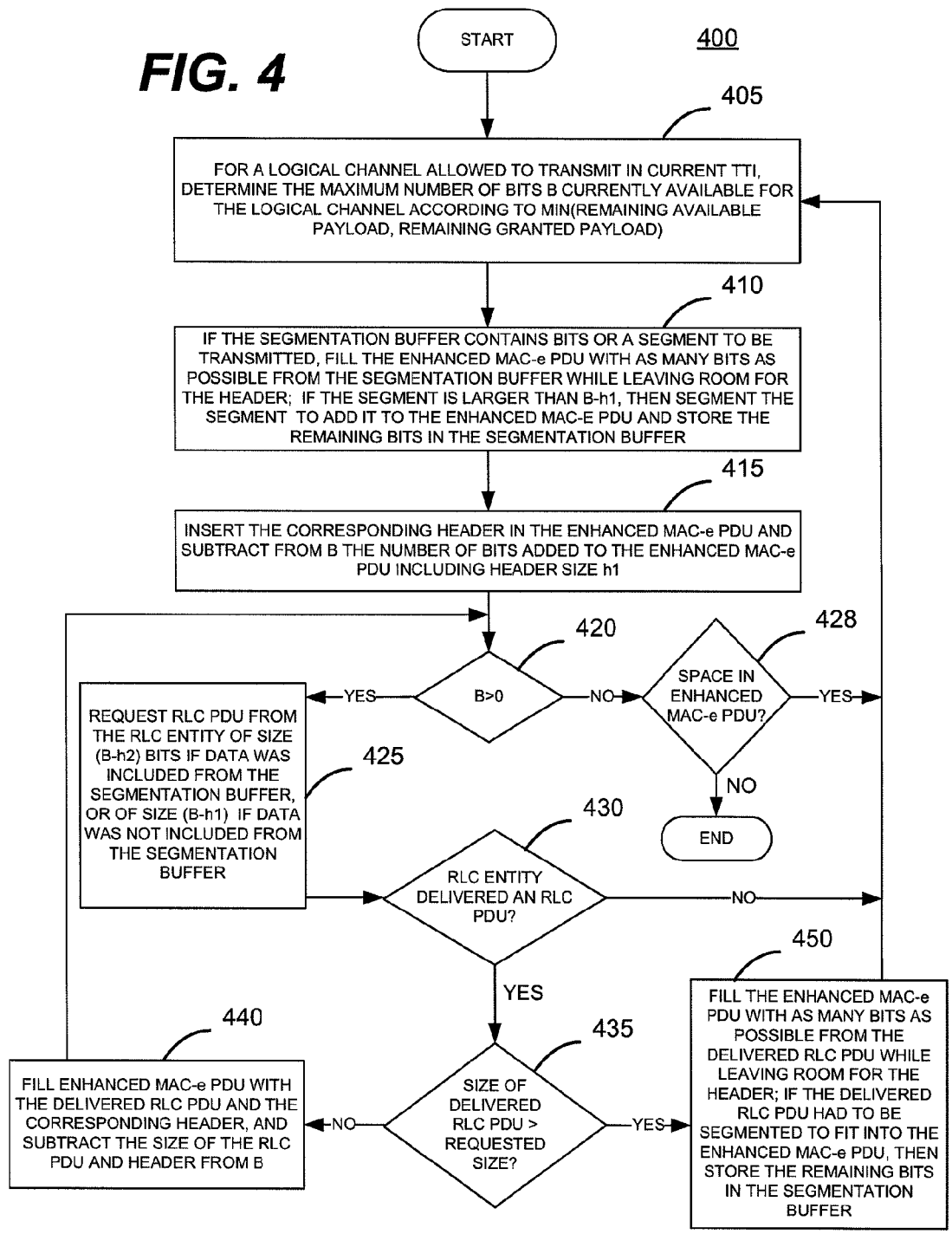
FIG. 4 shows a flow diagram of a procedure for filling an enhanced MAC-e PDU with data from logical channels as part of E-TFC selection in accordance with another embodiment.

FIG. 4 shows a flow diagram of a procedure 400 for filling a MAC-e PDU with data from logical channels as part of E-TFC selection in accordance with another embodiment. According to procedure 400, the MAC entity performs multiple requests to the RLC entity. The MAC entity asks for an RLC PDU size based on the selected E-TFC. If, after receiving the requested RLC PDU, there is still space available in the enhanced MAC-e PDU, the MAC entity may request additional RLC PDUs until the number of bits allowed to be transmitted for that logical channel is reached or exceeded. The Remaining Available Payload and Remaining Granted Payload have the same definition as provided above. Additionally, the variable h1 refers to the additional number of header bits required for including a first RLC PDU or segment thereof, and the variable h2 refers to the additional number of header bits required for including subsequent RLC PDUs or segments thereof belonging to the same logical channel. The variable B refers to the number of bits currently available for a logical channel.

Referring to FIG. 4, in step 405, for a logical channel allowed to transmit in the current TTI, a maximum number of bits B currently available for the logical channel are determined according to MIN(Remaining Available Payload, Remaining Granted Payload). As mentioned above, the Remaining Available Payload may take into account the quantization loss.

In step 410, if the segmentation buffer contains bits or a segment to be transmitted, then the enhanced MAC-e PDU is filled with as many bits as possible from the segmentation buffer while leaving room for the header; if the segment is larger than B−h1, then the segment is segmented to add it to the enhanced MAC-e PDU and the remaining bits are stored in the segmentation buffer. In step 415, the corresponding header is inserted in the enhanced MAC-e PDU and the number of bits added to the enhanced MAC-e PDU including header size h1 are subtracted from B.

In step 420, it is determined if B is greater than 0. If B is not greater than 0, then in step 428 it is determined if there is space available in the enhanced MAC-e PDU. If there is space in the enhanced MAC-e PDU, then procedure 400 returns to step 405 and is repeated for the next logical channel, if any, that is allowed to transmit in the current TTI. If there is no more space in the enhanced MAC-e PDU, then the procedure 400 ends.

If B is greater than 0, then in step 425 an RLC PDU is requested from the RLC entity of size (B−h2) bits if data was included from the segmentation buffer (in step 410), or of size (B−h1) if data was not included from the segmentation buffer (in step 410). In step 430, it is determined if the RLC entity delivered an RLC PDU. If the RLC entity did not deliver an RLC PDU, then procedure 400 returns to step 405 and is repeated for the next logical channel, if any, that is allowed to transmit in the current TTI.

If the RLC entity did deliver an RLC PDU, then in step 435 it is determined if the size of the delivered RLC PDU is less than the requested RLC PDU size, in terms of number of bits. If the delivered RLC PDU size is greater than the requested RLC PDU size, then in step 450, the enhanced MAC-e PDU is filled with as many bits as possible from the delivered RLC PDU while leaving room for the header; if the delivered RLC PDU had to be segmented to fit into the enhanced MAC-e PDU, then the remaining bits are stored in the segmentation buffer. Subsequently, procedure 400 returns to step 405 and is repeated for the next logical channel, if any, that is allowed to transmit in the current TTI.

If the delivered RLC PDU size is less than the requested RLC PDU size, then in step 440 the enhanced MAC-e PDU is filled with the delivered RLC PDU and the corresponding header, and the size of the RLC PDU and header are subtracted from B. Subsequently, procedure 400 returns to step 420 in order to attempt to fill the remaining space in the MAC-e PDU.

Figure 5:
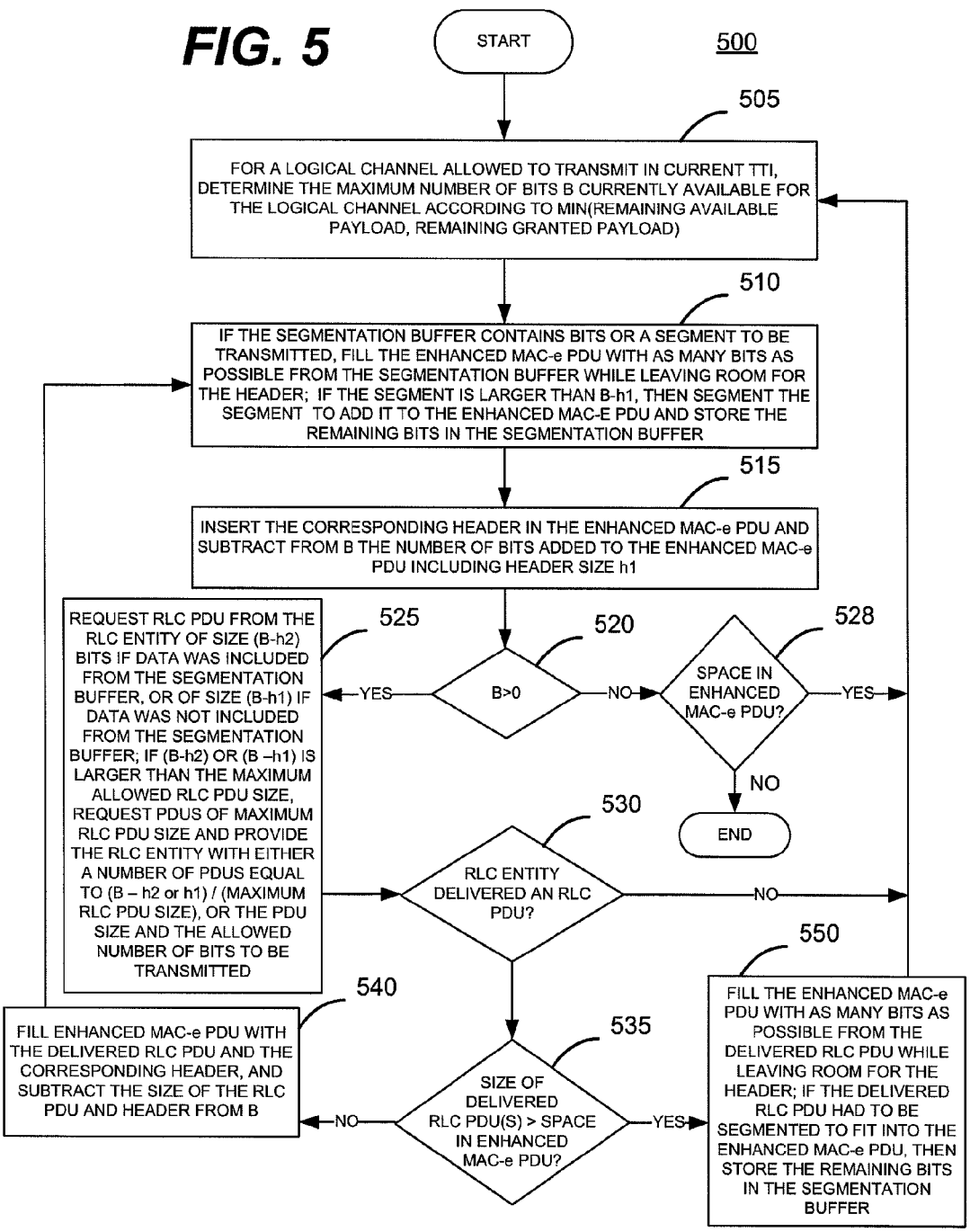
FIG. 5 shows a flow diagram of a procedure for filling an enhanced MAC-e PDU with data from logical channels as part of E-TFC selection in accordance with another embodiment.

FIG. 5 shows a flow diagram of a procedure 500 for filling a MAC-e PDU with data from logical channels as part of E-TFC selection in accordance with another embodiment. According to procedure 500, the MAC entity makes a single request to the RLC entity to create one or more PDUs of a set size. The RLC takes these inputs, and based on the amount of available data and the maximum amount of data to be transmitted, sends N RLC PDUs of the requested size. If an RLC PDU needs to be retransmitted, the RLC sends the retransmitted PDU(s), and if space is still available, also sends N new RLC PDUs of requested size. When choosing the number of RLC PDUs to be sent to the enhanced MAC-e/es entity, the RLC entity can send at a most one additional PDU, which exceeds the maximum available size to be transmitted.

Referring to FIG. 5, in step 505, for a logical channel allowed to transmit in the current TTI, a maximum number of bits B currently available for the logical channel are determined according to MIN(Remaining Available Payload, Remaining Granted Payload). As mentioned above, the Remaining Available Payload may take into account the quantization loss.

In step 510, if the segmentation buffer contains bits or a segment to be transmitted, then the enhanced MAC-e PDU is filled with as many bits as possible from the segmentation buffer while leaving room for the header; if the segment is larger than B−h1, then the segment is segmented to add it to the enhanced MAC-e PDU and the remaining bits are stored in the segmentation buffer. In step 515, the corresponding header is inserted in the enhanced MAC-e PDU and the number of bits added to the enhanced MAC-e PDU including header size h1 are subtracted from B.

In step 520, it is determined if B is greater than 0. If B is not greater than 0, then in step 528 it is determined if there is space available in the enhanced MAC-e PDU. If there is space in the enhanced MAC-e PDU, then procedure 500 returns to step 505 and is repeated for the next logical channel, if any, that is allowed to transmit in the current TTI. If there is no more space in the enhanced MAC-e PDU, then the procedure 500 ends.

If B is greater than 0, then in step 525 an RLC PDU is requested from the RLC entity of size (B−h2) bits if data was included from the segmentation buffer (in step 510), or of size (B−h1) if data was not included from the segmentation buffer (in step 510); if (B−h2) or (B−h1) is larger than the maximum allowed RLC PDU size, PDUs of the maximum RLC PDU size are requested and the RLC entity is provided with either a number of PDUs equal to (B−h2 or h1)/(maximum RLC PDU size), or the PDU size and the allowed number of bits to be transmitted. The enhanced MAC entity may consider the header size or the RLC may take the header size into account.

In step 530, it is determined if the RLC entity delivered an RLC PDU. If the RLC entity did not deliver an RLC PDU, then procedure 500 returns to step 505 and is repeated for the next logical channel, if any, that is allowed to transmit in the current TTI.

If the RLC entity did deliver an RLC PDU, then in step 535 it is determined if the size of the delivered RLC PDU(s) is less than the available space in the enhanced MAC-e PDU. If the delivered RLC PDU size is greater than the available space in the enhanced MAC-e PDU, then in step 550, the MAC-e PDU is filled with as many bits as possible from the delivered RLC PDU while leaving room for the header; if the delivered RLC PDU had to be segmented to fit into the MAC-e PDU, then the remaining bits are stored in the segmentation buffer. Subsequently, procedure 500 returns to step 505 and is repeated for the next logical channel, if any, that is allowed to transmit in the current TTI.

If the delivered RLC PDU size is less than the available space in the enhanced MAC-e PDU, then in step 540 the MAC-e PDU is filled with the delivered RLC PDU and the corresponding header, and the size of the RLC PDU and header are subtracted from B. Subsequently, procedure 500 returns to step 510 in order to fill the remaining space in the MAC-e PDU.

The RLC entity may also put a lower bound to the RLC PDU size it can create, for example a minimum RLC size. The minimum RLC PDU size can be configured by higher layers, or it can be a static value or a calculated value for optimal transmission. For example, if the number of bits requested by the MAC entity (or the number of requested bits−number of bits of retransmitted RLC PDU(s)) is less than the minimum RLC PDU size, then the RLC entity may do one or a combination of the following: it may not send any data down to the MAC entity, and it may create a larger RLC PDU with a size equal to or greater than a minimum RLC PDU size, such that the MAC entity will have to deal with a larger PDU.

In one embodiment, the WTRU may be configured to derive the minimum RLC PDU size from a minimum allowed MAC segment size, if such size is defined. For example, the minimum RLC PDU size may be a multiple of a minimum MAC segment size. Alternatively, the minimum RLC PDU size may be a static value that is preconfigured in the WTRU.

Alternatively, the UTRAN may determine the maximum RLC PDU size and communicate the maximum RLC PDU size value to the WTRU using L2 or L3 (RRC) signaling. For example, the UTRAN may configure the WTRU to use a minimum RLC PDU size and a maximum RLC PDU size using the RRC information element (IE) "RLC info." The signaling of the maximum RLC PDU size value may occur upon radio bearer configuration or radio bearer reconfiguration. Further, the signaling of the maximum RLC PDU size value may occur upon transport channel configuration or transport channel reconfiguration.

According to another embodiment, a technique is provided for maintaining a guaranteed bit rate (GBR) for non-scheduled data flows with variable-length headers. Non-scheduled data flows are data flows with a configured Guaranteed Bit Rate. With the introduction of Layer 2 enhancements in the uplink (UL), the enhanced MAC-e/es overhead became dependent on the RLC PDU size and on the number of RLC PDUs in the enhanced MAC-es PDU. When the network configures the grant for a non-scheduled data flows, it configures it so that the power used to transmit this data is enough to transmit the amount of required bits plus enhanced MAC-e/es header bits. The proposed method guarantees that the right amount of data can be transmitted within the configured grant, taking into account that the header fields vary based on the number of enhanced MAC-es SDUs. As described above, h1 refers to the additional number of header bits required for including a first RLC PDU or segment thereof, and h2 refers to the additional number of header bits required for including subsequent RLC PDUs or segments thereof belonging to the same logical channel. B refers to the number of bits current available for a logical channel.

In order to guarantee a bit rate for the non-scheduled data flows, any one of the following procedures may be used, alone or in combination. In one procedure, the network may give a conservative grant to the non-scheduled flow by taking into account the worst case scenario for enhanced MAC-e/es header space. This may be done by signaling or assuming a minimum RLC PDU size, for example, 300 bits, such that the RLC entity does not create RLC PDUs smaller than the minimum size, although MAC entity is allowed to segment those RLC PDUs. This establishes a worst-case overhead for the radio network controller (RNC), which is then used by the RNC to determine the non-scheduled grant. For example, if the intended GBR equals X bits/TTI, the network may allocate a non-scheduled grant of (X+h2+((X/min RLC PDU size)−1)*(h1) bits, accounting for the possibility of segmentation. In an alternate procedure, the network may give a conservative grant as described above, but based on an average RLC PDU size. In the case where the RLC PDUs are smaller than the average, the non-scheduled flow can take some of the scheduled flow's power to ensure that the required number of bits is transmitted. In another procedure, the network can configure a more flexible non-scheduled grant. This may be done by giving the WTRU an absolute value and a variance value, for example a +/− value, the WTRU is allowed to use).

FIG. 6 shows a flow diagram of a simplified procedure 600 for filling an enhanced MAC-e PDU with data from logical channels as part of E-TFC selection in accordance with another embodiment. In step 605, if there is a segment in the segmentation buffer, the segment is added to the enhanced MAC-e PDU, where the segment may be re-segmented to fit into the MAC-e PDU. In step 610, if there is space in the enhanced MAC-e PDU, a maximum number of bits allowed to be transmitted is requested from the RLC entity. In step 615, the received RLC PDU(s) is added to the MAC-e PDU to fill the available space in the MAC-e PDU, and a final RLC PDU may be segmented if needed in order to fit in the MAC-e PDU. Additionally, any of the steps in any of the procedures described above may be used in combination with procedure 600 to create an enhanced MAC-e PDU.

The procedure 300 of FIGS. 3A and 3B, the procedure 400 of FIG. 4, the procedure 500 of FIG. 5 and/or the procedure 600 of FIG. 6 as part of E-TFC selection may be performed by the E-TFC selection entity 212 of FIG. 2, where segmentation of RLC PDUs is performed by the segmentation entity 214 and segments may be stored in the segmentation buffer 216. Requests for bits from MAC-c, MAC-d or RLC entities are made by enhanced MAC-e/es entity 210.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for creating an enhanced medium access control (MAC-e) packet data unit (PDU) as part of enhanced transport format combination (E-TFC) selection comprising:
   determining if a segmentation buffer contains bits or a segment to be transmitted; if the segmentation buffer contains a segment to be transmitted, then:
   if the number of bits in the segment with a corresponding header is less than the smaller of a remaining available payload and a remaining granted payload, then:
   adding the segment with the corresponding header to the enhanced MAC-e PDU;
   subtracting a total number of bits added to the enhanced MAC-e PDU from the remaining granted payload and the remaining available payload; and
   if the remaining granted payload and the remaining available payload are greater than zero, requesting a number of bits equal to the smaller of the remaining available payload and the remaining granted payload from a radio link control (RLC) logical channel.

2. The method of claim 1 further comprising: if the number bits in the segment with a corresponding header is greater than the smaller of a remaining available payload and a remaining granted payload, then:
   segmenting the segment to produce a sub-segment with a number of bits equal to the smaller of the remaining available payload less a header size and the remaining granted payload less a header size;
   adding the sub-segment with the corresponding header to the enhanced MAC-e PDU; and subtracting a total number of bits added to the enhanced MAC-e PDU from the remaining granted payload and the remaining available payload, wherein the total number of bits added include bits added for a corresponding MAC-e header part.

3. The method of claim 2 wherein the corresponding header includes an enhanced MAC-e header and an enhanced MAC-e header.

4. The method of claim 1 further comprising:
if the segmentation buffer does not contain a segment to be transmitted, requesting a number of bits equal to the smaller of the remaining available payload and the remaining granted payload from the RLC logical channel.

5. The method of claim 1 further comprising: subtracting a number of bits corresponding to an enhanced MAC-es header part from the remaining available payload and the remaining granted payload prior to performing a request to the RLC logical channel.

6. The method of claim 5 further comprising:
receiving an at least one RLC PDU for the RLC logical channel in response to the requesting of a number of bits from the RLC logical channel;
determining the total size of the at least one RLC PDU with a corresponding enhanced MAC-e header part relative to the requested number of bits;
if the total size of the at least one RLC PDU with the corresponding header part is less than or equal to the requested number of bits, filling the enhanced MAC-e PDU with the at least one RLC PDU and corresponding headers; and
subtracting a total number of bits added to the enhanced MAC-e PDU from the remaining granted payload and the remaining available payload, wherein the total number of bits added include a number of bits for the RLC PDU and corresponding header parts.

7. The method of claim 6 further comprising:
if the total size of the at least one RLC PDU with the corresponding header is greater than the requested number of bits, then:
adding one or more complete RLC PDUs from among the at least one RLC PDU to the enhanced MAC-e PDU;
segmenting a last RLC PDU from among the at least one RLC PDU to generate a sub-segment and a remaining segment;
adding the sub-segment to the enhanced MAC-e PDU; ang storing the remaining segment in the segmentation buffer; and subtracting a total number of bits added to the enhanced MAC-e PDU from the remaining granted payload and the remaining available payload, wherein the total number of bits added include a number of bits for the RLC PDU and corresponding header parts.

8. The method of claim 7 wherein the sub-segment has a number of bits equal to a remaining space available in the enhanced MAC-e PDU while leaving space for an enhanced MAC-e header part for the RLC logical channel.

9. The method of claim 6 wherein the at least one RLC PDU is one of a MAC-c PDU and a MAC-d PDU.

10. The method of claim 1 where the RLC logical channel is allowed to transmit in a current transmission time interval (TTI) and satisfies multiplexing restrictions in the current TTI.

11. The method of claim 1 wherein the remaining available payload is a maximum amount of data that can be transmitted in a current transmission time interval (TTI) and is based on one or more of: available grants, scheduled grants, non-scheduled grants, a maximum available power and a selected power offset, wherein a scheduling information is taken into account when determining the remaining available payload, if a scheduling information has been triggered.

12. The method of claim 1 wherein the remaining granted payload is a maximum amount of data that can be transmitted due to a serving grant and selected power offset for the RLC logical channel corresponding to a scheduled MAC-d flow.

13. The method of claim 1 wherein the remaining granted payload is a maximum amount of data that can be transmitted due to a non-scheduled grant for the logical channel corresponding to a non-scheduled MAC-d flow.

14. The method of claim 1 further comprising: processing the next highest priority channel satisfying a multiplexing restriction when there is no more data available in a current logical channel in the a current transmission time interval (TTI) and the remaining available payload is not used up.

15. The method of claim 1 further comprising:
processing the next highest priority channel satisfying a multiplexing restriction when the remaining granted payload is used up and the remaining available payload is not used up.

16. The method of claim 1 further comprising:
terminating the method for a current transmission time interval (TTI) when the remaining available payload is used up.

17. The method of claim 1 further comprising:
terminating the method for a current transmission time interval (TTI) when there is no more data available in logical channels in the current TTI.

18. The method of claim 1 performed for logical channels satisfying multiplexing restrictions in order of priority.

19. The method of claim 1 performed by a wireless transmit/receive unit (WTRU).

20. A wireless transmit/receive unit (WTRU) configured to create an enhanced medium access control (MAC-e) packet data unit (PDU) as part of enhanced transport format combination (E-TFC) selection comprising:
a segmentation buffer configured to store segments;
an E-TFC selection entity configured to determine if the segmentation buffer contains bits or a segment to be transmitted;
if the segmentation buffer contains a segment to be transmitted, then:
if the number of bits in the segment with a corresponding header is less than the smaller minimum of a remaining available payload and a remaining granted payload, then:
the E-TFC selection entity configured to add the segment with the corresponding header to the enhanced MAC-e PDU;
the E-TFC selection entity configured to subtract a total number of bits added to the enhanced MAC-e PDU from the remaining granted payload and the remaining available payload; and
if the remaining granted payload and the remaining available payload are greater than zero, an enhanced MAC-e/es entity configured to request a number of bits equal to the smaller of the remaining available payload and the remaining granted payload from a radio link control (RLC) logical channel.

21. The WTRU of claim 20 further comprising:
if the number bits in the segment with a corresponding header is greater than the smaller of a remaining available payload and a remaining granted payload, then:
a segmentation entity configured to segment the segment to produce a sub-segment with a number of bits equal to the smaller of the remaining available payload less a header size and the remaining granted payload less a header size;

the E-TFC selection entity configured to add the sub-segment with the corresponding header to the enhanced MAC-e PDU; and the E-TFC selection entity configured to subtract a total number of bits added to the enhanced MAC-e PDU from the remaining granted payload and the remaining available payload, wherein the total number of bits added include bits added for a corresponding MAC-e header part.

22. The WTRU of claim 21 wherein the corresponding header includes an enhanced MAC-es header and an enhanced MAC-e header.

23. The WTRU of claim 20 wherein: if the segmentation buffer does not contain a segment to be transmitted, the enhanced MAC-e/es entity is configured to request a number of bits equal to the smaller of the remaining available payload and a remaining granted payload from the RLC logical channel.

24. The WTRU of claim 20 wherein:
the E-TFC selection entity is configured to subtract a number of bits corresponding to an enhanced MAC-es header part from the remaining available payload and the remaining granted payload prior to performing a request to the RLC logical channel.

25. The WTRU of claim 24 wherein:
the enhanced MAC-e/es entity is configured to receive an at least one RLC PDU for the RLC logical channel in response to the requesting of a number of bits from the RLC logical channel;
the E-TFC selection entity is configured to determine the total size of the at least one RLC PDU with a corresponding enhanced MAC-e header part relative to the requested number of bits;
if the total size of the at least one RLC PDU with the corresponding header part is less than or equal to the requested number of bits, the E-TFC selection entity is configured to fill the enhanced MAC-e PDU with the at least one RLC PDU and corresponding headers; and
the E-TFC selection entity is configured to subtract a total number of bits added to the enhanced MAC-e PDU from the remaining granted payload and the remaining available payload, wherein the total number of bits added include a number of bits for the RLC PDU and corresponding header parts.

26. The WTRU of claim 25 wherein:
if the total size of the at least one RLC PDU with the corresponding header is greater than the requested number of bits, then:
the E-TFC selection entity is configured to add one or more complete RLC PDUs from among the at least one RLC PDU to the enhanced MAC-e PDU; the WTRU further comprising:
a segmentation entity configured to segment a last RLC PDU from among the at least one RLC PDU to generate a sub-segment and a remaining segment;

the E-TFC selection entity is configured to add the sub-segment to the enhanced MAC-e PDU;
the segmentation buffer is configured to store the remaining segment in the segmentation buffer; and
the E-TFC selection entity is configured to subtract a total number of bits added to the enhanced MAC-e PDU from the remaining granted payload and the remaining available payload, wherein the total number of bits added include a number of bits for the RLC PDU and corresponding header parts.

27. The WTRU of claim 26 wherein the sub-segment has a number of bits equal to a remaining space available in the enhanced MAC-e PDU while leaving space for the enhanced MAC-e header part for the RLC logical channel.

28. The WTRU of claim 25 wherein the at least one RLC PDU is one of a MAC-c PDU and a MAC-d PDU.

29. The WTRU of claim 20 wherein the remaining available payload is a maximum amount of data that can be transmitted in a current transmission time interval (TTI) and is based on one or more of: available grants, scheduled grants, non-scheduled grants, a maximum available power and a selected power offset, wherein a scheduling information is taken into account when determining the remaining available payload, if a scheduling information has been triggered.

30. The WTRU of claim 20 wherein the remaining granted payload is a maximum amount of data that can be transmitted due to a serving grant and selected power offset for the RLC logical channel corresponding to a scheduled MAC-d flow.

31. The WTRU of claim 20 wherein the remaining granted payload is a maximum amount of data that can be transmitted due to a non-scheduled grant for the logical channel corresponding to a non-scheduled MAC-d flow.

32. The WTRU of claim 20 wherein:
the enhanced MAC-e/es entity is configured to process the next highest priority channel satisfying a multiplexing restriction when there is no more data available in a current logical channel in the a current transmission time interval (TTI) and the remaining available payload is not used up.

33. The WTRU of claim 20 wherein: the enhanced MAC-e/es entity is configured to process the next highest priority channel satisfying a multiplexing restriction when the remaining granted payload is used up and the remaining available payload is not used up.

34. The WTRU of claim 20 wherein:
the enhanced MAC-e/es entity is configured to terminate E-TFC selection for a current transmission time interval (TTI) when the remaining available payload is used up.

35. The WTRU of claim 20 wherein: the enhanced MAC-e/es entity is configured to terminate E-TFC selection for a current transmission time interval (TTI) when there is no more data available in logical channels in the current TTI.

36. The WTRU of claim 20 wherein:
the enhanced MAC-e/es entity is configured to perform E-TFC selection for logical channels satisfying multiplexing restrictions in order of priority.

* * * * *

UNITED STATES PATENT AND TRADEMARK OFFICE
CERTIFICATE OF CORRECTION

PATENT NO. : 8,179,877 B2  
APPLICATION NO. : 12/239097  
DATED : May 15, 2012  
INVENTOR(S) : Diana Pani et al.

Page 1 of 1

It is certified that error appears in the above-identified patent and that said Letters Patent is hereby corrected as shown below:

In claim 1, column 12, line 43, a new line should be inserted between "...transmitted;" and "if...."

In claim 2, column 12, line 58, a new line should be inserted between "...comprising:" and "if...."

In claim 3, column 13, line 7, "includes an enhanced MAC-e header" should read "includes an enhanced MAC-es header".

In claim 5, column 13, line 15, a new line should be inserted between "...comprising:" and "subtracting...."

In claim 7, column 13, line 46, "ang" should be deleted.

In claim 7, column 13, line 46, a new line should be inserted after "MAC-e PDU;"

In claim 7, column 13, line 48, a new line should be inserted between "and" and "subtracting...."

In claim 14, column 14, line 12, a new line should be inserted between "comprising:" and "processing...."

In claim 20, column 14, line 46, "minimum" should be deleted.

In claim 23, column 15, line 16, a new line should be inserted between "...wherein:" and "if the...."

In claim 26, column 15, line 54, a new line should be inserted between "...MAC-e PDU;" and "the WTRU...."

In claim 33, column 16, line 40, a new line should be inserted between "...wherein:" and "the enhanced...."

In claim 35, column 16, line 49, a new line should be inserted between "...wherein:" and "the enhanced...."

Signed and Sealed this  
Nineteenth Day of February, 2013

Teresa Stanek Rea  
*Acting Director of the United States Patent and Trademark Office*